United States Patent
Kim et al.

(10) Patent No.: US 10,303,038 B2
(45) Date of Patent: May 28, 2019

(54) BEAM STEERING APPARATUS AND SYSTEM INCLUDING THE SAME

(71) Applicant: SAMSUNG ELECTRONICS CO., LTD., Suwon-si (KR)

(72) Inventors: Sunil Kim, Osan-si (KR); Duhyun Lee, Yongin-si (KR); Jungwoo Kim, Hwaseong-si (KR); Changbum Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 15/227,012

(22) Filed: Aug. 3, 2016

(65) Prior Publication Data

US 2017/0153528 A1    Jun. 1, 2017

(30) Foreign Application Priority Data

Nov. 27, 2015    (KR) .......................... 10-2015-0167502

(51) Int. Cl.
*G02F 1/29*    (2006.01)

(52) U.S. Cl.
CPC .......... *G02F 1/293* (2013.01); *G02F 2202/10* (2013.01); *G02F 2202/30* (2013.01); *G02F 2203/58* (2013.01)

(58) Field of Classification Search
CPC ............. G02F 2203/58; G02F 2202/30; G02F 2202/10; G02F 1/29; G02F 1/293; G02F 1/0126; G02F 1/3511; G02F 1/01716; B82Y 20/00

See application file for complete search history.

(56) References Cited

U.S. PATENT DOCUMENTS

| | | | |
|---|---|---|---|
| 6,611,367 B1* | 8/2003 | Naya | G02F 1/0126 252/582 |
| 6,982,819 B2* | 1/2006 | Sawin | B82Y 20/00 359/245 |
| 7,936,448 B2 | 3/2011 | Albuqueque et al. | |
| 8,755,035 B2 | 6/2014 | Mizuno et al. | |
| 2009/0219606 A1* | 9/2009 | Lawrence | G02F 1/061 359/299 |
| 2010/0271614 A1 | 10/2010 | Albuquerque et al. | |
| 2013/0341900 A1 | 12/2013 | Lazzari et al. | |
| 2014/0240812 A1* | 8/2014 | Han | G02F 1/332 359/286 |

FOREIGN PATENT DOCUMENTS

JP    2011209676 A    10/2011
KR    1020060054532 A    5/2006

* cited by examiner

*Primary Examiner* — Joseph P Martinez
*Assistant Examiner* — Vipin Patel
(74) *Attorney, Agent, or Firm* — Sughrue Mion, PLLC

(57) ABSTRACT

A beam steering apparatus includes a transformation layer, of which a refraction index is changed by light irradiation, a pattern layer arranged on the transformation layer and comprises a plurality of patterns, and a light irradiation unit arranged under the transformation layer. The pattern layer has patterns of a metasurface shape to reflect an external laser. The light irradiation unit may emit light having different characteristics.

18 Claims, 6 Drawing Sheets

BEAM STEERING APPARATUS AND SYSTEM INCLUDING THE SAME

CROSS-REFERENCE TO RELATED APPLICATION

This application claims priority from Korean Patent Application No. 10-2015-0167502, filed on Nov. 27, 2015, in the Korean Intellectual Property Office, the disclosure of which is incorporated herein in its entirety by reference.

BACKGROUND

1. Field

Apparatuses and systems consistent with exemplary embodiments relate to beam steering apparatuses and systems including the same.

2. Description of the Related Art

To direct (or steer) a beam such as a laser in a desired direction, the following methods are generally employed. For example, a laser irradiation part is mechanically rotated or interference between laser bundles of a pixel type or a waveguide type is used. When the above methods are used, the pixel type or the waveguide type may be electrically or thermally controlled, and thus, a beam such as a laser may be steered in a desired direction.

To mechanically drive a laser, the application of a motor or a micro electro mechanical systems (MEMS) structure is needed. However, in this case, a volume of a whole apparatus is increased, and costs for parts may also be increased. Also, in the case of a motor, noise may be generated, and in the case of the MEMS structure, a vibration problem may occur. Thus, the application of the motor and the MEMS structure is limited in various fields.

SUMMARY

One or more exemplary embodiments provide beam steering apparatuses having a simple structure.

One or more exemplary embodiments also provide beam steering apparatuses that steer a beam in different directions from each other in respective regions of a transformation layer.

Additional aspects will be set forth in part in the description which follows and, in part, will be apparent from the description, or may be learned by practice of the exemplary embodiments.

According to an aspect of an exemplary embodiment, a beam steering apparatus includes a transformation layer, of which a refraction index is changed by light irradiation, a pattern layer that is arranged on the transformation layer and including a plurality of patterns, and a light irradiation unit arranged under the transformation layer.

Each of the plurality of patterns of the pattern layer may have a metasurface shape.

The pattern layer may include a metal, comprising at least one of Ag, Au, and Al, or an alloy of the metal.

The pattern layer may include a metal nitride including at least one of TiN and TaN.

Each of the plurality of patterns of the pattern layer may have at least one of a circular shape, an oval shape, and a polygonal shape.

The pattern layer may have patterns having at least one of a size and a gap between the patterns smaller than a wavelength of a beam irradiated to the pattern layer.

The transformation layer may include a semiconductor oxide.

The transformation layer may include at least one of Indium-Tin-Oxide (ITO), Indium-Zinc-Oxide (IXO), Ga—In—Zn-Oxide (GIZO), Al—Zn-Oxide (AZO), Ga—Zn-Oxide (GZO), and ZnO.

The transformation layer may have a charge concentration in a range from about $1 \times 10^{15}/cm^3$ to about $1 \times 10^{23}/cm^3$.

The irradiation unit may include at least two light irradiation elements configured to respectively irradiate lights having wavelengths or intensities different from each other.

The transformation layer may include separation layers arranged between regions, of the transformation layer, to which the lights having wavelengths or intensities different from each other enter are irradiated.

The irradiation unit may include a single light irradiation element configured to irradiate light having wavelengths or intensities different from each other.

The irradiation unit may include a single light irradiation element, and lights having wavelengths or intensities different from each other are irradiated onto respective regions of the transformation layer.

The transformation layer may include regions having different thicknesses from each other.

The irradiation unit may irradiate at least one of a visible ray and an ultraviolet ray to the transformation layer.

According to an aspect of another exemplary embodiment, a system includes: the beam steering apparatus described above, a light source configured to irradiate a light to the beam steering apparatus, a detector configured to detect a beam steered by the beam steering apparatus, and a driving circuit configured to control at least one of the light source, the beam steering apparatus, and the detector.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
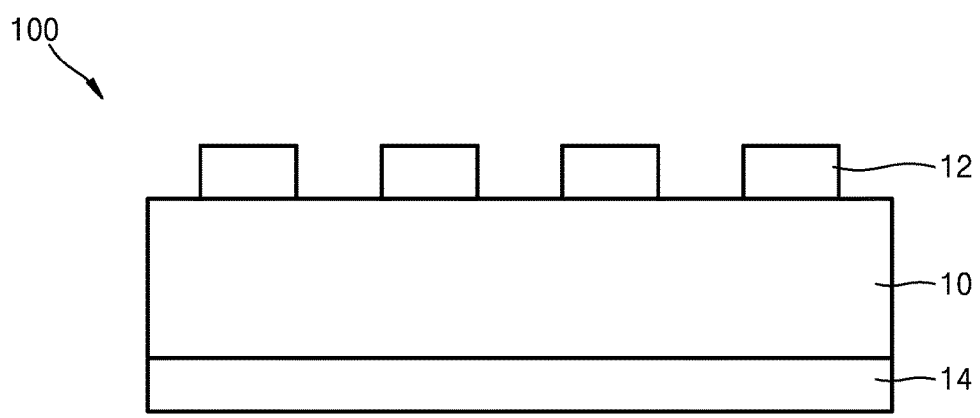
FIG. 1 is a cross-sectional view of a beam steering apparatus according to an exemplary embodiment.

A beam steering apparatus and a system including the same according to exemplary embodiments will now be described in detail with reference to the accompanying drawings. In the drawings, widths and thicknesses of layers or regions may be exaggerated or reduced for clarity of the specification Like numerals refer to like elements throughout the description of the figures.

The exemplary embodiments include all modifications, equivalents, and substitutions without departing from the scope and spirit of the disclosure. When an element or layer is referred to as being "on" or "above" another element or layer, the element or layer may be directly on another element or layer or intervening elements or layers.

FIG. 1 is a cross-sectional view of a beam steering apparatus 100 according to an exemplary embodiment.

Referring to FIG. 1, the beam steering apparatus 100 according to an exemplary embodiment includes a transformation layer 10, a pattern layer 12 formed on the transformation layer 10, and a light irradiation unit (or light irradiator) 14 formed under the beam steering apparatus 100 to irradiate light to the transformation layer 10. The pattern layer 12 may include a plurality of patterns having a metasurface shape. The metasurface denotes a surface comprising patterns, and a distance between the patterns may be smaller than a half size of a wavelength of an incident beam. The light irradiation unit 14 may be formed to contact the transformation layer 10 under the transformation layer 10. Alternatively, the light irradiation unit 14 may be separated from the transformation layer 10 and irradiate light to the transformation layer 10. The light irradiation unit 14 may be a backlight disposed on a rear surface of the transformation layer 10.

Figure 2:
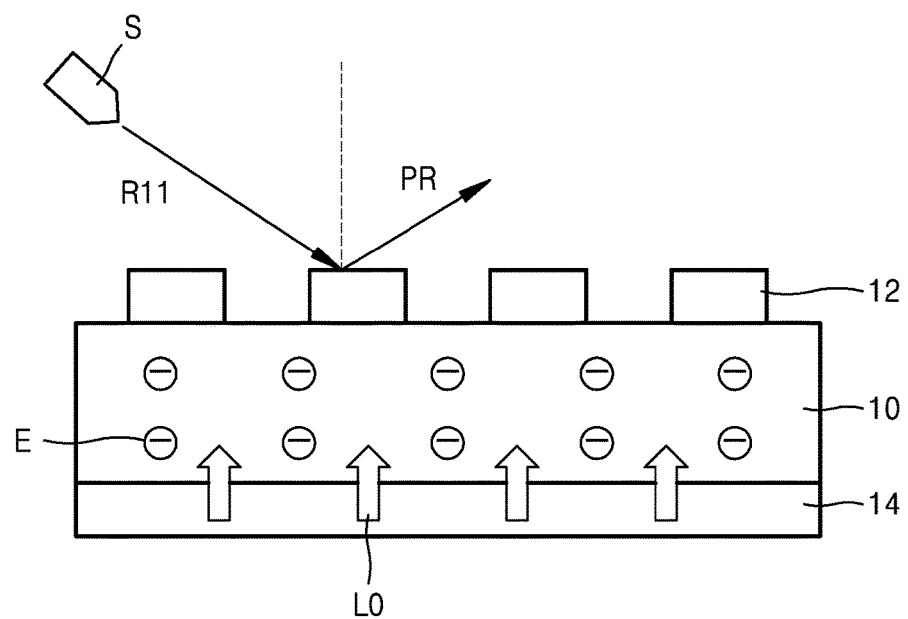
FIG. 2 is a schematic cross-sectional view illustrating an operation of a beam steering apparatus according to an exemplary embodiment.

FIG. 2 is a schematic cross-sectional view illustrating an operation of the beam steering apparatus 100 according to an exemplary embodiment.

Referring to FIGS. 1 and 2, light L0 is irradiated onto the transformation layer 10 from the light irradiation unit 14 that is formed under the transformation layer 10 of the beam steering apparatus 100. The light L0 irradiated from the light irradiation unit 14 to the transformation layer 10 may change a carrier concentration of the transformation layer 10. Accordingly, a refraction index of a material that constitutes the transformation layer 10 may be changed from a refraction index n0 to a refraction index n1. Accordingly, the refraction index of a material that constitutes the transformation layer 10 may be controlled to a desired magnitude. After the refraction index of the transformation layer 10 is changed, incident light R11 is irradiated from an external light source S with respect to the transformation layer 10 and the pattern layer 12 on the transformation layer 10 of the beam steering apparatus 100. In a state in which the refraction index of the material that constitutes the transformation layer 10 is changed from n0 to n1, the light R11 irradiated from the external light source S may be reflected at a surface of the pattern layer 12 and emitted as light PR at a desired angle.

The light irradiation unit 14 may comprise at least one or more light irradiation elements. The light irradiation unit 14 may comprise a single light irradiation element that irradiates light having wavelengths or intensities different from each other. Also, according to regions of the transformation layer 10, the light irradiation unit 14 may irradiate light having wavelengths or intensities different from each other. Also, the light irradiation unit 14 may comprise two or more light irradiation elements, and each of the light irradiation elements may irradiate light having a wavelength or intensity different from each other.

Figure 3A:
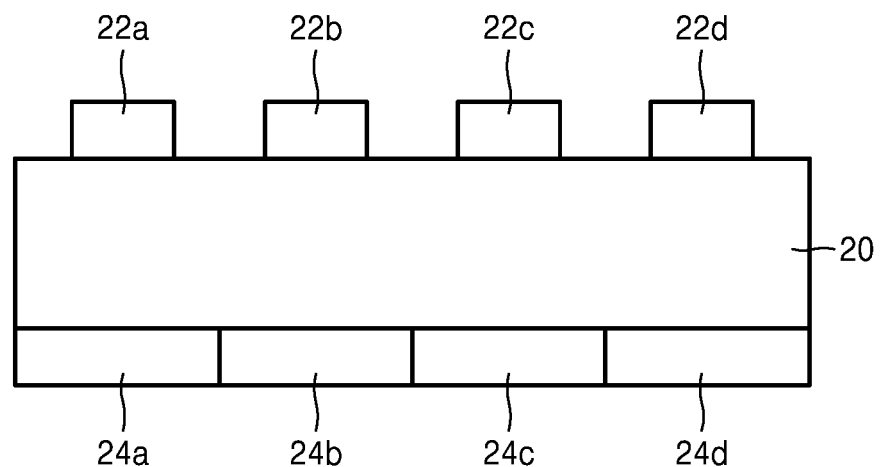
FIG. 3A is a cross-sectional view of a plurality of light irradiation elements in the beam steering apparatus of FIG. 1.

FIG. 3A is a cross-sectional view of a plurality of light irradiation elements in the beam steering apparatus 100 of FIG. 1.

Referring to FIG. 3A, the beam steering apparatus according to an exemplary embodiment includes a transformation layer 20 and a pattern layer on the transformation layer 20. The beam steering apparatus 100 also includes a light irradiation unit under the transformation layer 20 to irradiate light to the transformation layer 20. The light irradiation unit may include at least two or a plurality of light irradiation elements that may irradiate light of different characteristics from each other. In FIG. 3A, the pattern layer of the beam steering apparatus includes first through fourth patterns 22a, 22b, 22c, and 22d and the light irradiation unit includes first through fourth light irradiation elements 24a, 24b, 24c, and 24d, but exemplary embodiments are not limited thereto. Here, the light of different characteristics may denote different wavelengths or intensities of lights respectively emitted from the first through fourth light irradiation elements 24a, 24b, 24c, and 24d. For example, at least one of a wavelength and an intensity of light emitted from the first light irradiation element 24a is different from at least one of a wavelength and an intensity of light emitted from the second light irradiation element 24b. All of the first through fourth light irradiation elements 24a, 24b, 24c, and 24d may not need to emit lights having different characteristics from each other.

For example, the first through third light irradiation elements 24a, 24b, and 24c may emit lights having the same wavelengths or intensities, and the fourth light irradiation element 24d may emit light having one of a wavelength and an intensity different from at least one of a wavelength and an intensity of the lights emitted from the first through third light irradiation elements 24a, 24b, and 24c.

The first through fourth light irradiation elements 24a, 24b, 24c, and 24d may change the magnitude of a refraction index of the transformation layer 20 to a desired magnitude of refraction index. Accordingly, the emission direction of light reflected by the first through fourth patterns 22a, 22b, 22c, and 22d formed on the transformation layer 20 may be controlled, which will be described below.

Figure 3B:
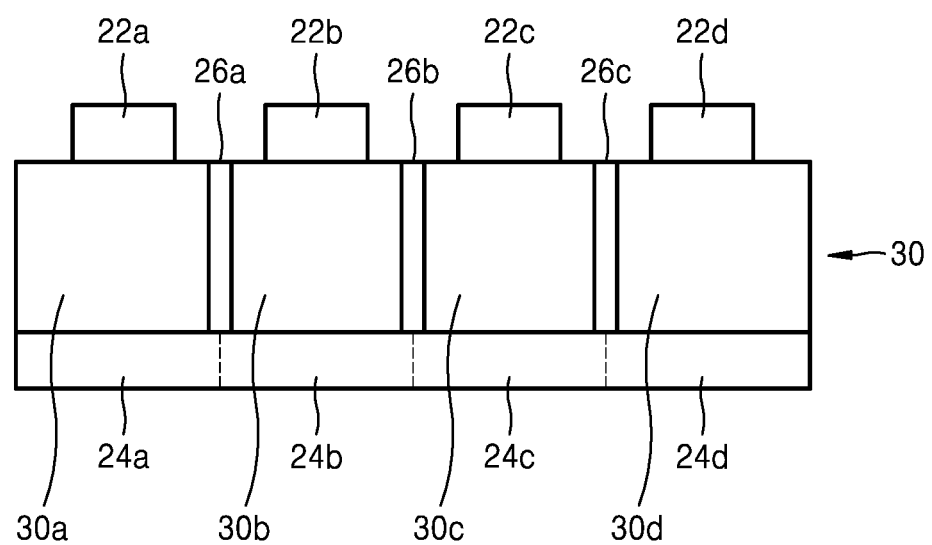
FIG. 3B is a cross-sectional view of a structure having at least one separation layer in a transformation layer of the beam steering apparatus of FIG. 3A.

FIG. 3B is a cross-sectional view of a structure having at least one separation layer in a transformation layer of the beam steering apparatus of FIG. 3A.

Referring to FIG. 3B, the beam steering apparatus according to an exemplary embodiment may include at least two or a plurality of light irradiation elements 24a, 24b, 24c, and 24d and a plurality of separation layers 26a, 26b, and 26c in a transformation layer 30 to correspond to regions between the first through fourth light irradiation elements 24a, 24b, 24c, and 24d. That is, a first separation layer 26a may be formed between the first and second light irradiation elements 24a and 24b, and a second separation layer 26b may be formed between the second and third light irradiation elements 24b and 24c. Also, a third separation layer 26c may be formed between the third and fourth light irradiation elements 24c and 24d.

In this manner, the first through third separation layers 26a, 26b, and 26c may be formed in regions of the transformation layer 30 to which lights having different characteristics, that is, wavelengths or intensities different from each other are irradiated.

The first through third separation layers 26a, 26b, and 26c may be optional. However, when the first through third separation layers 26a, 26b, and 26c are formed, the regions of the transformation layer 30 corresponding to the first through fourth light irradiation elements 24a, 24b, 24c, and 24d may be divided into first through fourth transformation layers 30a, 30b, 30c, and 30d. The transformation layer 30 in a region in which a refraction index is changed according to characteristics, that is, a wavelength or intensity of light emitted from the first through fourth light irradiation elements 24a, 24b, 24c, and 24d formed under the transformation layer 30. Thus, when the first through third separation layers 26a, 26b, and 26c are formed in the transformation layer 30, each of the regions of the transformation layer 30 may not be affected by the first through fourth light irradiation elements 24a, 24b, 24c, and 24d disposed corresponding to other regions of the transformation layer 30.

For example, when the characteristics of lights emitted from the first light irradiation element 24a and the second light irradiation element 24b are different from each other, light emitted from the second light irradiation element 24b is blocked by the first separation layer 26a from entering the first transformation layer 30a formed on the first light irradiation element 24a, and thus, the refraction index of the first transformation layer 30a may be controlled only by the characteristics of the light emitted from the first light irradiation element 24a.

Figure 4:
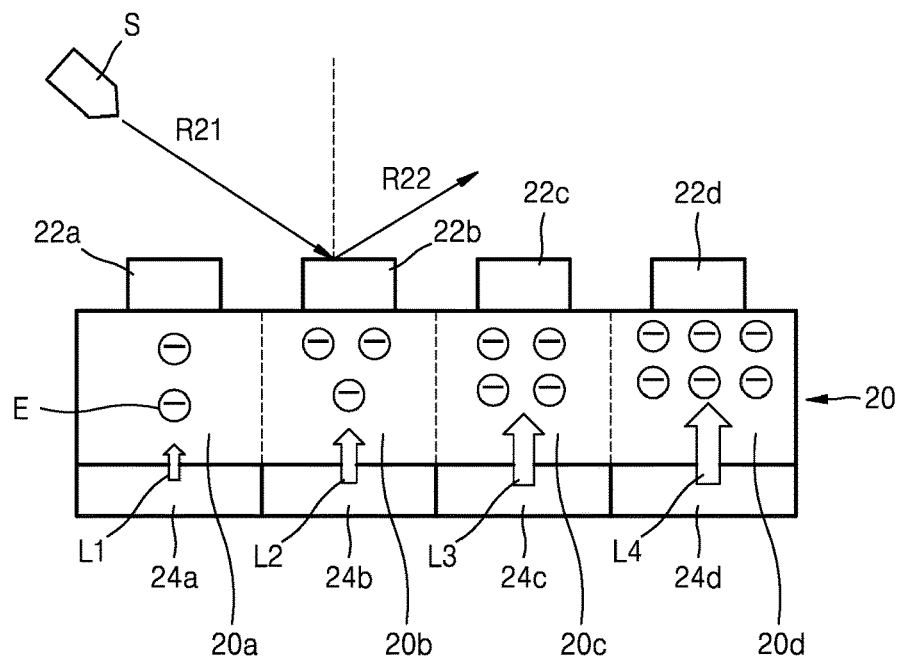
FIG. 4 is a schematic cross-sectional view illustrating a method of operating the beam steering apparatus of FIG. 3A.

FIG. 4 is a schematic cross-sectional view of illustrating a method of operating the beam steering apparatus of FIG. 3A.

Referring to FIG. 4, lights L1, L2, L3, and L4 are respectively irradiated with respect to the transformation layer 20 from the first through fourth light irradiation elements 24a, 24b, 24c, and 24d formed under the transformation layer 20 of the beam steering apparatus. A plurality of light irradiation elements that may emit lights having characteristics different from each other may be formed under the transformation layer 20. Each of the first through fourth light irradiation elements 24a, 24b, 24c, and 24d irradiates light to correspond regions of the transformation layer 20 formed thereon or thereabove. In detail, the first light irradiation element 24a irradiates the light L1 to a first transformation layer 20a, and the second light irradiation element 24b irradiates the light L2 to a second transformation layer 20b. Also, the third light irradiation element 24c irradiates the light L3 to a third transformation layer 20c, and the fourth light irradiation element 24d irradiates the light L4 to a fourth transformation layer 20d. Here, at least one of the lights L1 through L4 may be a light having at least one of a wavelength or an intensity different from those of the other lights.

When the lights L1 through L4 are irradiated and pass through the transformation layer 20 from the first through fourth light irradiation elements 24a, 24b, 24c, and 24d, respectively, concentration of charges in each of the regions 20a, 20b, 20c, and 20d of the transformation layer 20 may be changed. The carrier concentration or the charge concentration of the transformation layer 20 may be changed, for example, in a range from $1 \times 10^{15}/cm^3$ to $1 \times 10^{23}/cm^3$. Accordingly, the refraction index of a material that is included in the transformation layer 20 may be changed from a refraction index n0 to a refraction index n2. When the characteristics of the lights L1 through L4 irradiated to each of the regions 20a, 20b, 20c, and 20d of the transformation layer 20 are different from each other, carrier concentrations E in each of the regions 20a, 20b, 20c, and 20d of the transformation layer 20 may be different from each other. At this point, the regions 20a, 20b, 20c, and 20d of the transformation layer 20 may have refraction indices n21, n22, n23, and n24 different from each other. As a result, the refraction index of a material included in the transformation layer 20 may be controlled to a desired magnitude. After the refraction index of the transformation layer 20 is changed, a light R21 is irradiated to the transformation layer 20 of the beam steering apparatus and one of the first through fourth patterns 22a, 22b, 22c, and 22d formed on the transformation layer 20, from an external light source S. In a state in which the refraction index of a material included in the transformation layer 20 is changed, the light irradiated from the external light source S may be reflected at surfaces of one of the patterns 22a, 22b, 22c, and 22d and emitted as a light R22.

Figure 5A:
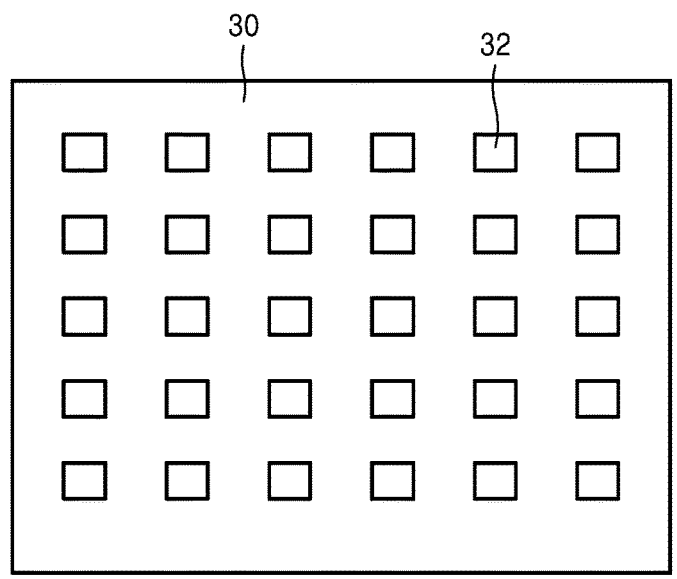
FIGS. 5A through 5C show types of patterns formed on a transformation layer of a beam steering apparatus according to exemplary embodiments.
Figure 5B:
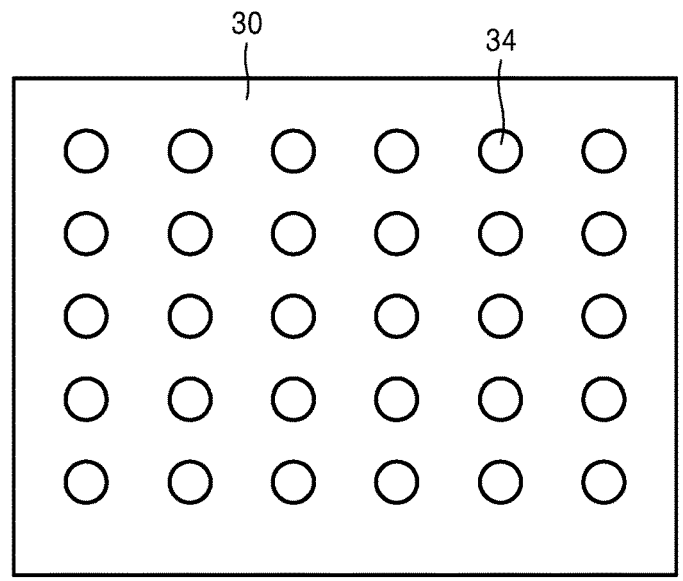
Figure 5C:
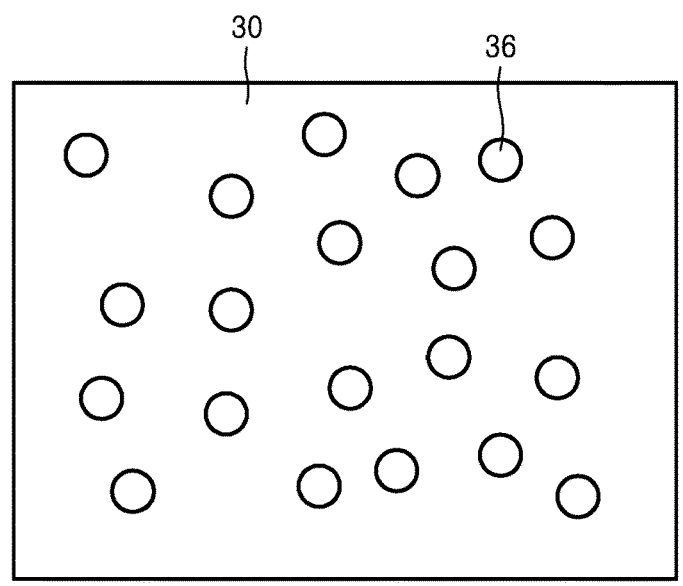

FIGS. 5A through 5C show types of patterns formed on a transformation layer of a beam steering apparatus according to exemplary embodiments.

Referring to FIG. 5A, a transformation layer 30 of a beam steering apparatus according to an exemplary embodiment may include a transparent conductive material. For example, the transformation layer 30 may include at least one of Indium-Tin-Oxide (ITO), Indium-Zinc-Oxide (IXO), Ga—In—Zn-Oxide (GIZO), Al—Zn-Oxide (AZO), Ga—Zn-Oxide (GZO), and ZnO.

A pattern layer 32 formed on the transformation layer 30 may have patterns of a metasurface shape. The pattern layer 32 may include a metal, such as Ag, Au, Al, or Pt or an alloy of the metal. The pattern layer 32 may also include a metal nitride, such as TiN or TaN. The pattern layer 32 may be an antenna pattern layer.

The pattern layer 32 may include patterns of various shapes. For example, the patterns of the pattern layer 32 may have a rectangular shape and may be arranged at a predetermined interval, as shown in a plane view of FIG. 5A. However, the type, arrangement, and shape of patterns of the pattern layer 32 are not limited thereto. For example, as shown in FIG. 5B, patterns of the pattern layer 32 may have a circular shape. In another example, the pattern layer 32 may include patterns having a polygonal shape, such as triangular shape or a rectangular shape, or an oval shape or an irregular shape.

As depicted in FIGS. 5A and 5B, the pattern layer 32 may be arranged such that patterns are spaced apart from each other to have a certain gap therebetween. Alternatively, as depicted in FIG. 5C, the gaps between patterns may be randomly set, and thus, the patterns 36 may be irregularly arranged. Pitches, that is, gaps between the patterns, diameters, and lengths of the patterns of the patterns 32, 34, and 36 of the beam steering apparatus according to the exemplary embodiments may be smaller than a ½ or ⅓ of a wavelength of incident light R11 entering the pattern layer 12 from the light source S as depicted in FIG. 2. For example, when the wavelength of the incident light R11 is 1,500 nm, the pitch of the patterns of the pattern layer 12 may be 500 nm or less.

Figure 6A:
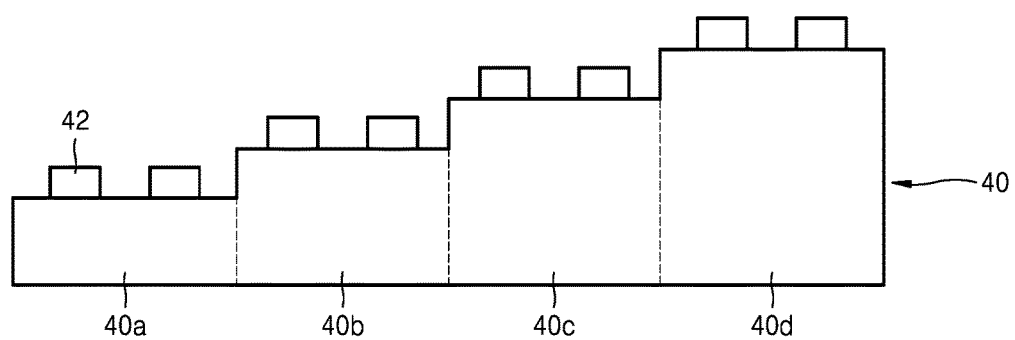
FIGS. 6A and 6B show structures of a transformation layer having regions of different thicknesses in a beam steering apparatus according to exemplary embodiments.
Figure 6B:
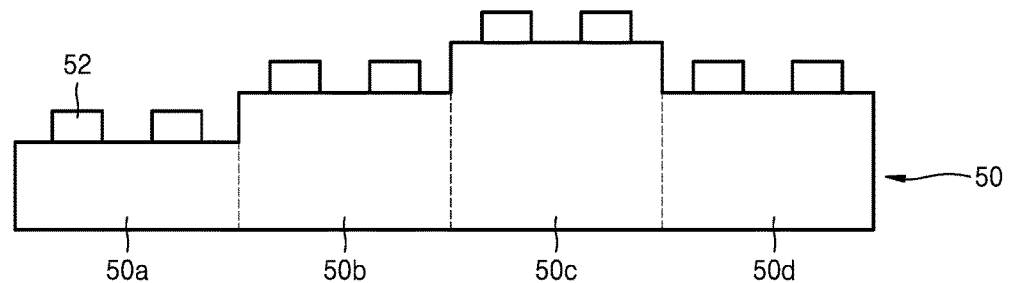

FIGS. 6A and 6B show structures of a transformation layer having regions of different thicknesses in a beam steering apparatus according to exemplary embodiments.

Referring to FIGS. 6A and 6B, transformation layers 40 and 50 of a beam steering apparatus according to an exemplary embodiment may include a plurality of regions having various thicknesses and pattern layers 42 and 52 are formed on the respective regions of the transformation layers 40 and 50. Referring to FIG. 6A, first through fourth transformation layers 40a through 40d may have different thicknesses from each other. For example, as depicted in FIG. 6A, the thickness of the transformation layer 40 may be gradually increased from the first transformation layer 40a to the fourth transformation layer 40d. Alternatively, as depicted in FIG. 6B, the thickness of the transformation layer 50 is gradually increased from a first transformation layer 50a to a third transformation layer 50c, and the thickness of the transformation layer 50 is reduced again at a fourth transformation layer 50d. However, this is merely an example and the exemplary embodiments are not limited thereto.

Referring again to FIGS. 1 through 4, the light irradiation unit of the beam steering apparatus according to the exemplary embodiments may emit visible ray or ultraviolet ray (UV). The transformation layers 10, 20, and 30 according to the exemplary embodiments may include a transparent conductive material, for example, ITO. The transparent conductive material may have a wide band-gap and various energy states may be present in the band-gap. The carrier concentration of the transformation layers 10, 20, and 30 may be changed by light of visible ray region or UV ray region that is emitted from the light irradiation unit and passes through the transformation layers 10, 20, and 30. Accordingly, the refraction index of the transformation layers 10, 20, and 30 may be changed, and the incident light R11 emitted from the light source S may be a laser light of infrared ray or visible ray, and thus, the reflection angle of the incident light R11 at the pattern layers 12, 22a, 22b, 22c and 22d may be changed according to the change of the refraction index of the transformation layers 10, 20, and 30.

In this manner, the beam steering apparatus according to the exemplary embodiments includes the pattern layers 12, 22a, 22b, 22c and 22d having patterns of a metasurface shape on the transformation layers 10, 20, and 30, and thus, may steer a beam by changing the refraction indices of the transformation layers 10, 20, and 30 by using light irradiated to the transformation layers 10, 20, and 30.

Figure 7:
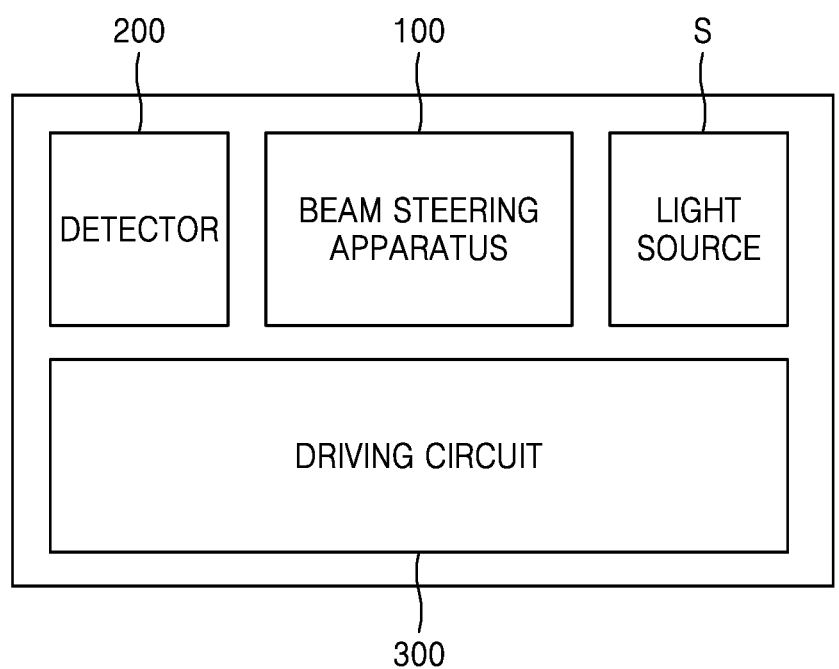
FIG. 7 shows a system having a beam steering apparatus according to an exemplary embodiment.

FIG. 7 shows a system having a beam steering apparatus according to an exemplary embodiment.

Referring to FIG. 7, the system according to an exemplary embodiment may include the beam steering apparatus 100, a light source S that irradiates light to the beam steering apparatus 100, a detector 200 that detects a beam steered by the beam steering apparatus 100, and a driving circuit 300 that respectively controls the light source S, the beam steering apparatus 100, and the detector 200.

The system that includes the beam steering apparatus 100 may optically steer a beam and may be used as, for example, a solid state light detection and ranging (LiDAR) system that recognizes surrounding objects that are scanned by the steered beam.

According to the exemplary embodiments, a beam steering apparatus that includes a transformation layer, a refraction index of which is changed by light irradiated thereto and has a simple structure, is provided. Also, according to the exemplary embodiments, a beam steering apparatus having a transformation layer, refraction indices of regions of which are controllable, is provided.

Although a few embodiments have been shown and described, it would be appreciated by those skilled in the art that changes may be made in the example embodiments without departing from the principles and spirit of the disclosure, the scope of which is defined in the claims and their equivalents.

What is claimed is:

1. A beam steering apparatus comprising:
    a transformation layer, of which a refraction index is changed by light irradiated from a light irradiation unit;
    a pattern layer arranged on the transformation layer and comprising a plurality of patterns; and
    the light irradiation unit arranged under the transformation layer,
    wherein at least one of a size of or a gap between the plurality of patterns is smaller than a wavelength of a beam irradiated to the pattern layer, and
    wherein the light irradiation unit is arranged directly on a lower surface of the transformation layer opposite to the pattern layer.

2. The beam steering apparatus of claim 1, wherein each of the plurality of patterns of the pattern layer has a metasurface shape.

3. The beam steering apparatus of claim 2, wherein the pattern layer comprises a metal, comprising at least one of Ag, Au, or Al, or an alloy of the metal.

4. The beam steering apparatus of claim 2, wherein the pattern layer comprises a metal nitride including at least one of TiN or TaN.

5. The beam steering apparatus of claim 2, wherein each of the plurality of patterns of the pattern layer has at least one of a circular shape, an oval shape, or a polygonal shape.

6. The beam steering apparatus of claim 1, wherein the transformation layer comprises a semiconductor oxide.

7. The beam steering apparatus of claim 6, wherein the transformation layer comprises at least one of Indium-Tin-Oxide (ITO), Indium-Zinc-Oxide (IXO), Ga—In—Zn-Oxide (GIZO), Al—Zn-Oxide (AZO), Ga—Zn-Oxide (GZO), or ZnO.

8. The beam steering apparatus of claim 6, wherein the transformation layer has a charge concentration in a range from about $1\times10^{15}/cm^3$ to about $1\times10^{23}/cm^3$.

9. The beam steering apparatus of claim 1, wherein the light irradiation unit comprises at least two light irradiation elements configured to respectively irradiate lights having wavelengths or intensities different from each other.

10. The beam steering apparatus of claim 9, wherein the transformation layer comprises separation layers arranged between regions, of the transformation layer, to which the lights having wavelengths or intensities different from each other are irradiated.

11. The beam steering apparatus of claim 1, wherein the light irradiation unit comprises a single light irradiation element configured to irradiate lights having wavelengths or intensities different from each other.

12. The beam steering apparatus of claim 1, wherein the light irradiation unit comprises a single light irradiation element configured to irradiate lights having wavelengths or intensities different from each other onto different regions of the transformation layer.

13. The beam steering apparatus of claim 1, wherein the light irradiation unit is further configured to irradiate at least one of a visible ray and an ultraviolet ray to the transformation layer.

14. A system comprising:
    the beam steering apparatus of claim 1;
    a light source configured to irradiate the beam to the pattern layer of the beam steering apparatus;
    a detector configured to detect a beam steered by the beam steering apparatus; and
    a driving circuit configured to control at least one of the light source, the beam steering apparatus, or the detector.

15. The beam steering apparatus of claim 1, wherein at least one of a size of or a gap between the plurality of patterns is smaller than a half of a wavelength of a beam irradiated to the pattern layer.

16. A beam steering apparatus comprising:
    a transformation layer, of which a refraction index is changed by light irradiated from a light irradiation unit;
    a pattern layer arranged on the transformation layer and comprising a plurality of patterns; and
    the light irradiation unit arranged under the transformation layer,
    wherein at least one of a size of or a gap between the plurality of patterns is smaller than a wavelength of a beam irradiated to the pattern layer, wherein the transformation layer comprises regions having different thicknesses from each other, and wherein an upper surface and a lower surface of each of the regions are parallel to each other.

17. The beam steering apparatus of claim 16, wherein the thickness of the transformation layer is gradually increased from a first region of the transformation layer to a second region of the transformation layer and is reduced from the second region of the transformation layer to a third region of the transformation layer.

18. The beam steering apparatus of claim 16, wherein the upper surfaces of the regions are spaced apart from one another.

\* \* \* \* \*